Nov. 18, 1924.   1,516,268
A. E. DRISSNER
COMBINED SHAVING AND BURNISHING TOOL
Filed Nov. 5, 1921
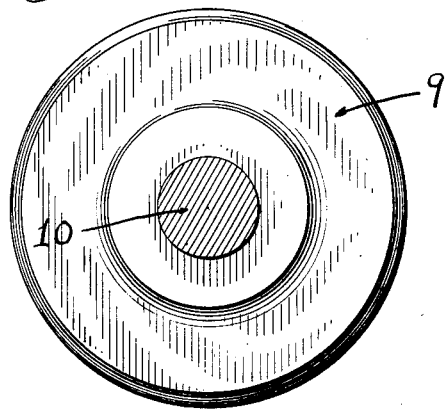
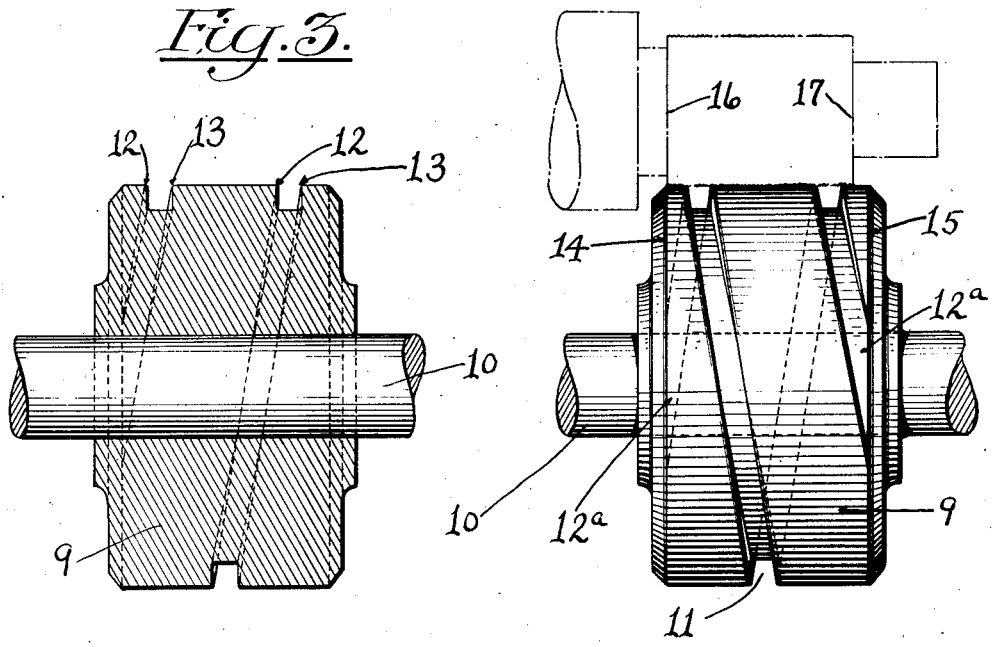

Patented Nov. 18, 1924.

1,516,268

UNITED STATES PATENT OFFICE.

ALFRED E. DRISSNER, OF CLEVELAND, OHIO, ASSIGNOR TO THE NATIONAL ACME COMPANY, OF CLEVELAND, OHIO, A CORPORATION OF OHIO.

COMBINED SHAVING AND BURNISHING TOOL.

Application filed November 5, 1921. Serial No. 513,207.

*To all whom it may concern:*

Be it known that I, ALFRED E. DRISSNER, a citizen of the United States, residing at Cleveland, in the county of Cuyahoga and State of Ohio, have invented certain new and useful Improvements in Combined Shaving and Burnishing Tools, of which the following is a specification.

This invention relates to machine tools, more particularly to that form thereof known as burnishing tools or rolls, the object thereof being to provide a burnishing tool or roll which will also shave the work simultaneously with the burnishing thereof, whereby both the operations of shaving and burnishing are effected by the same tool instead of as heretofore, by separate tools.

A further object of this invention is to provide a tool adapted to shave the work and at the same time to burnish it, which will be economical and facile to manufacture, adapted to be applied to many different kinds of holders, and adapted to be used to shave and burnish the work on either the inside or outside faces of the work irrespective of whether these faces or surfaces are tapered, straight or any other shape heretofore adapted to be burnished by other tools.

A further object of this invention is to provide a combined shaving and burnishing tool comprising a rotatable body provided with a spiral groove therein, having its edges formed as cutting edges effective to shave the work while the smooth surfaces of the tool or roll adjacent to such cutting edges are effective to burnish or polish the work. One of the important advantages of this invention resides in the fact that the tool will penetrate the surface of the work considerably deeper than burnishing or shaving tools heretofore constructed, and as a result of this construction, the work before being operated upon by the present tool does not have to be cut as smooth and true in order to obtain a polish, free from scratches, as in the case of the work prior to being burnished by tools heretofore used. Thus, the present combined tool having relatively deep penetrating cutting edges will shave off any ridges on the work left by the preceding tool, thereby leaving a clear polished or burnished surface.

Furthermore, the spiral groove having one or more cutting edges is preferably open at one or both ends and preferably has a range of operation greater than the length of the work whereby the chips or the like removed from the work will be carried into and through the groove to the free end or ends thereof, thus permitting the tool to be automatically cleared of the chips.

Other objects of the invention will appear in the following description thereof, reference being had to the accompanying drawing forming a part of this specification, wherein like reference characters indicate corresponding parts in the several views, and in which Fig. 1 is an end elevation of my improved combination tool; Fig. 2 is a side view thereof, the work being illustrated diagrammatically; and Fig. 3 is a longitudinal section thereof.

In its preferred form my improved combined shaving and burnishing tool comprises a suitable rotatable member or roller 9, the same being constructed in any preferred shape or form and also of a width suited to the particular work in hand. This rotatable member or roller 9 is suitably faced on each side and bored so as to be adapted to receive a holder 10. It is of course understood that the bore in the roller may be of any desired diameter or shape in order to accommodate various types of holders. In the outer surface or periphery of the roller is machined a spiral groove 11, the same in the present instance being open at both ends, as illustrated at 12ª, or in other words the groove extends in a spiral manner about the roller preferably from one lateral edge to the opposed edge thereof.

The surface of this roller is ground after hardening and as a result of the construction, sharp cutting edges 12 and 13 are formed by the grooves, two being preferably shown in this instance in order to provide a reversible tool. The lead or effective range of operation of the groove, which is herein shown as defined between the lateral edges 14 and 15 of the roller is preferably greater or longer than the length of the work to be burnished and shaved, as is indicated in Fig. 2 between the lines 16 and 17. For example, if the work is one inch long, the lead or range of operation of the groove 11 may be at least one and one-eighth inches long. The purpose of this construction is to permit the chips resulting from shaving to be cleared when the roller revolves over the work after the first revolution, it being understood that the chips from the work are carried into and through the groove 11 to the open end 12ª thereof.

In the operation of the tool as shown herein, in its preferred form, the work is preferably rotated, as by power, and upon carrying the tool or roll 9 into engagement with the face of the work, the roll is caused to rotate with the work, since as shown herein, it is rotatably mounted upon the shaft or holder 10 thereby causing the spiral cutting edge to shave the work while the burnishing thereof is taking place, that is to say, this spiral cutting edge does the shaving while the adjoining and intermediate smooth surface of the roll does the burnishing, so that the roll 9 is rotated by the work and is effective to perform the combined operation of shaving and burnishing at the same time by the same roll. As shown herein, the tool operates merely by engagement of the faces of the tool and the work and there is no endwise shifting of the tool as a whole across the face of the work, that is to say, the roll has no longitudinal or endwise movement on its holder or shaft 10, and while in practice either the work or the roll or both might be driven by power, yet this has not been found to be necessary, as entirely satisfactory results have been obtained by rotating the work and merely holding the shaving and burnishing roll in engagement therewith.

In other words, as shown herein, the tool is primarily intended for use with such machines as multiple spindle screw machines wherein the work is rotated so that various tools will perform certain operations thereon, and when these operations are completed then the work or the burnishing tool is brought into engagement one with the other, thereby to perform its operations, but the particular manner of supporting or effecting the operation of the work and the tool one relatively to the other is not believed to be material to a complete understanding of the improvement which has to do primarily with the construction of the tool roll.

It has been found that the relative diameters of the work and the roll should be different, that is, the diameter of one should be smaller or larger than that of the other and in the present instance the roll is shown as having the larger diameter.

It is a well known fact among those familiar with burnishing tools, that the work to be burnished leaves the cutting or forming tools with a series of ridges and grooves, which may be likened very much to a toothed or serrated surface, so that when the ordinary burnishing tool is used against the points of these serrations or ridges the effect is to mash them down, that is, to turn or bend over these slightly projecting surfaces or ridges, and in consequence, when the work was subsequently hardened, these bent-over portions would peel off; therefore in order to avoid this, the work had to be shaved by one tool to shave off these ridges or points, and then subsequently burnished by a burnishing roll. This meant of course the use of two separate and distinct tools, involving considerable loss of time and additional labor, and therefore increased expense, but in the present improvement, as the single tool, comprising a combined shaving and burnishing roll, operates to shave through the medium of the cutting edges of the spiral groove and to burnish through the medium of the adjacent surfaces of the roll, the work of shaving and burnishing may be said to be done in one-half the time heretofore required, and with equally good, if not superior results, and certainly so where the work was burnished only.

In the present instance it will be seen that the angle formed by the side wall of the groove and the face of the tool is substantially no greater than a right angle. For the purpose of doing the proper work, for which the tool is designed, it is not intended that the cut of the spiral groove shall be any deeper than the depth of the ridges, scratches, or the like to be removed from the face of the work, although it has been found in practice that the tool will penetrate as much as three times or more deeper than previous burnishing tools, and it will be observed that in the present instance the groove is narrower than the face of the tool between the grooved portions of the roll.

As a result of the use of this improved tool, it has been found that the work does not have to be cut as smooth and true in order to get as clear polish free from tool scratches, since such scratches or roughened surface will be effectively removed by this improved tool whereas heretofore if a clear polish free from tool scratches was desired without any shaving of the work subsequent to the forming or cutting thereof, it was necessary that the surface be cut very smooth and true in order that the burnishing tool produce a reasonably clear polish or smooth surface, and even then the surface would frequently peel or scale.

It will be understood that the width and depth of this groove depend upon the diameter of the work and the amount of room required in the groove for the reception and passage of the chips from the work, and it will also be understood that the width, length, diameter and shape of the roller may also be varied in accordance with the particular work to be burnished and shaped, the important feature of the present invention residing in the provision of a rotatable member having a spiral groove preferably forming a plurality of cutting edges which may be open at one or both ends to permit the clearance of chips of the groove, the construction being such as to enable the single tool to both shave and burnish the work in an efficient and effective manner.

It will also be observed that by virtue of the opposed cutting edges 12 and 13 formed by the groove, the tool is reversible and therefore may be rotated in either direction as desired. In the present instance the groove 11, which may be of any suitable width and depth, is provided with substantially straight or parallel side walls forming preferably right angled cutting edges 12 and 13, one thereof operative to shave the work during the operation of the tool in one direction and the other operative in the same manner during the operation of the tool in a reverse direction. Thus a reversible rotary tool effective to simultaneously shave and burnish the work in a single operation is provided by virtue of the present invention, the reversely operative right angled cutting edges 12 and 13 being shown as a continuous groove therebetween extending spirally from one end of the tool to the other and forming a channel or passage adapted to automatically convey the chips or the like from the point of operation.

As a result of the present improvement in burnishing tools or rolls a very much improved method of burnishing the work is obtained.

Although I have described my invention in its preferred form herein shown and described, it is to be understood that I do not limit myself to this construction, except in so far as defined in the claims or embraced within the scope thereof, since I believe that I am the first to provide a burnishing roll with both a shaving or cutting portion and a burnishing portion,—in other words the first to provide a single combined shaving and burnishing tool or roll operative to simultaneously shave and burnish the work, and this regardless of how the cutting or burnishing surfaces are formed and whether or not the cutting surfaces are formed by a single spiral groove or a plurality thereof.

In other words, I believe I am the first to provide a combined shaving and burnishing roll operative to burnish the work while the shaving thereof is proceeding.

I claim as my invention:

1. A combined burnishing and shaving tool having a burnishing surface, and having between the ends of said burnishing surface means for shaving the work while the burnishing thereof is proceeding.

2. A burnishing roll having a burnishing surface and having between the ends of such burnishing surface a cutting edge.

3. A burnishing tool having a burnishing surface and having between the ends of such burnishing surface a spiral cutting or shaving edge.

4. A combined burnishing and shaving roll having a burnishing surface and having between the ends of such burnishing surface a spiral cutting or shaving edge operative to shave the work during the burnishing thereof.

5. A burnishing roll having therein a spiral groove provided with opposed cutting edges.

6. A burnishing roll having a burnishing surface having therein a spiral groove terminating at the ends of the roll and effective to convey the chips away from the work, said groove having a cutting edge effective to shave the work as the burnishing thereof proceeds.

7. The combination of means for rotatably supporting a piece of work to be burnished, a rotary burnishing roll, means for supporting it in juxtaposition to the work, said burnishing roll having a burnishing surface, and between the ends of such burnishing surface a spiral cutting or shaving edge, said roll having a different diameter from the work to be shaved or burnished.

8. The combination of means for rotatably supporting a piece of work to be burnished, a rotary burnishing roll, means for supporting it in juxtaposition to the work, said burnishing roll having a burnishing surface, and between the ends of such burnishing surface a spiral cutting or shaving edge, said roll having a greater diameter than the work to be shaved or burnished.

9. The combination of a stationary supporting means, a rotary burnishing roll mounted thereon for rotation and having a burnishing surface and having between the ends of such burnishing surface a spiral cutting or shaving edge, whereby on the juxtaposition of the roll to a rotary piece of work the roll will be rotated on its stationary supporting means.

10. The combination of a rotary burnishing roll having a spiral cutting edge, means for supporting said roll, and means for rotatably supporting the work to be shaved and burnished by the roll, one of said supporting means being rotatable relatively to the other, whereby the work and the roll will be rotated one from the other.

11. The combination of a rotary burnishing roll having a spiral cutting edge, means for supporting said roll, and means for rotatably supporting the work to be shaved and burnished by the roll, said last supporting means being rotatable, whereby the burnishing roll will be rotated by the work.

12. The combination of a rotary burnishing roll having a spiral cutting edge, means for supporting said roll, and means for rotatably supporting the work to be shaved and burnished by the roll, one of said supporting means being rotatable relatively to the other, whereby the work and the roll will be rotated one from the other, the work and the roll having different diameters.

13. The combination of a rotary burnish-roll having a spiral cutting edge, means for supporting said roll, and means for rotatably supporting the work to be shaved and burnished by the roll, one of said supporting means being rotatable relatively to the other, whereby the work and the roll will be rotated one from the other, the work and the roll having different diameters, said spiral cutting edge being formed by a groove effective to convey the chips away from the work.

14. A tool of the class described comprising a roll effective to burnish the work and having a spiral groove intersecting the burnishing surface provided with a cutting edge, whereby on the rotation of said roll it will both shave and burnish the work simultaneously.

15. A tool of the class described comprising a roll effective to burnish the work and having a spiral groove intersecting the burnishing surface provided with a cutting edge, whereby on the rotation of said roll it will both shave and burnish the work simultaneously, said groove so terminating that the chips from the work will be conveyed away therefrom.

16. A rotary burnishing roll with a burnishing surface having therein a single spiral groove provided with a cutting edge.

17. A combined shaving and burnishing tool comprising a roll having a spiral groove therein with the edge thereof forming a cutting or shaving portion and the surface of the roll at the side of said groove forming a burnishing surface and both operative simultaneously to shave and burnish the work.

18. A burnishing roll with a burnishing surface having therein a spiral groove provided with a cutting edge, the width of the groove being less than the width of an adjacent surface of the roll.

19. The combination of work supporting means for supporting the work to be burnished, a burnishing roll with a burnishing surface having therein a spiral groove provided with a cutting edge, the width of the groove being less than the width of an adjacent surface of the roll and said roll having a diameter different from the work to be operated on.

20. A burnishing roll having therein a spiral groove, the wall of the groove and the face of the roll being located at substantially a right angle, thereby forming a cutting edge constructed to shave the work during the burnishing thereof by the roll.

21. A reversible burnishing roll having therein opposed cutting edges.

22. A burnishing roll with a burnishing surface having a spirally formed groove therein provided with a cutting edge, the lead of the groove being somewhat longer than the work to be shaved and burnished.

23. A combined reversible shaving and burnishing roll with a burnishing surface having between the ends of such burnishing surface means for shaving and operative to burnish the work while the shaving thereof is proceeding.

24. A combined burnishing and shaving roll having a spiral cutting edge effective to shave during the operation of the roll in one direction, and a spiral cutting edge effective to shave during the operation of the roll in the reverse direction and either operative during the burnishing of the work by the roll.

25. A reversible tool for shaving and burnishing the work having a pair of cutting edges extending toward the opposite ends of the tool, one thereof operative during the operation of the tool in one direction and the other operative during the operation thereof in a reverse direction, and either operative during the burnishing of the work.

26. A combined shaving and burnishing roll, the peripheral surface of the roll forming a burnishing surface, said roll having within said peripheral surface a cutting surface adapted to shave the work simultaneously with the burnishing thereof.

27. The combination of means for supporting a piece of work to be burnished, a combined shaving and burnishing roll, the peripheral surface of the roll forming a burnishing surface, said roll having within said peripheral surface a cutting surface adapted to shave the work simultaneously with the burnishing thereof and said roll having a diameter different from the diameter of the work to be operated upon.

28. The method of shaving and burnishing a piece of work which consists in providing a roll with a burnishing surface having therein a spiral cutting or shaving portion, then rotatably supporting it in juxtaposition to a rotatable piece of work, said burnishing roll and work having different diameters, and then rotating one of said rotatable parts thereby to rotate the other, thereby to simultaneously shave and burnish the work.

29. The method of shaving and burnishing a piece of work which consists in providing a roll having a burnishing surface provided therein with a spiral cutting or shaving portion, then rotatably supporting it in juxtaposition to a rotatable work roll, said rolls having different diameters, then rotating said work roll thereby to rotate the burnishing roll.

Signed at Cleveland, Ohio, this 28th day of October, 1921.

ALFRED E. DRISSNER.